(12) United States Patent
Björni

(10) Patent No.: US 9,381,770 B2
(45) Date of Patent: Jul. 5, 2016

(54) GUIDE RAIL OF AN ELEVATOR, AND AN ELEVATOR

(75) Inventor: Osmo Björni, Hyvinkää (FI)

(73) Assignee: Kone Corporation, Helsinki (FI)

( * ) Notice: Subject to any disclaimer, the term of this patent is extended or adjusted under 35 U.S.C. 154(b) by 688 days.

(21) Appl. No.: 13/598,127

(22) Filed: Aug. 29, 2012

(65) Prior Publication Data

US 2013/0056310 A1 Mar. 7, 2013

Related U.S. Application Data

(63) Continuation of application No. PCT/FI2011/000017, filed on Mar. 22, 2011.

(30) Foreign Application Priority Data

Mar. 24, 2010 (FI) ...................................... 20100129

(51) Int. Cl.
*B66B 7/02* (2006.01)
*B66B 5/18* (2006.01)
*B60B 7/02* (2006.01)

(52) U.S. Cl.
CPC . *B60B 7/02* (2013.01); *B66B 7/022* (2013.01); *B66B 7/024* (2013.01); *B66B 7/026* (2013.01)

(58) Field of Classification Search
CPC ........... B66B 7/022; B66B 7/024; E01B 5/02; E01B 25/00
USPC ............................ 187/406, 408; 104/124–128
IPC ............... B66B 7/02; B61B 3/00, 5/02
See application file for complete search history.

(56) References Cited

U.S. PATENT DOCUMENTS

| | | | |
|---|---|---|---|
| 5,788,206 A * | 8/1998 | Bunker | 248/634 |
| 6,991,070 B1 * | 1/2006 | Sanz Gamboa | 187/408 |
| 2002/0134624 A1* | 9/2002 | Sasaki | B66B 5/22 187/376 |
| 2004/0262095 A1* | 12/2004 | Rogger | 187/408 |
| 2008/0011558 A1* | 1/2008 | Lusquinos | 187/406 |

FOREIGN PATENT DOCUMENTS

| | | | | |
|---|---|---|---|---|
| CN | 201183699 Y | 1/2009 | | |
| DE | 1102362 B | 3/1961 | | |
| DE | 2232377 A1 | 1/1974 | | |
| DE | 2232377 A1 * | 1/1974 | ............. | B66B 7/022 |
| EP | 1876132 A1 | 1/2008 | | |

(Continued)

OTHER PUBLICATIONS

Chinese Office Action dated Aug. 6, 2014 issued in corresponding Chinese Application No. 201180024937.7.

(Continued)

*Primary Examiner* — William A Rivera
*Assistant Examiner* — Stefan Kruer
(74) *Attorney, Agent, or Firm* — Harness, Dickey & Pierce, P.L.C.

(57) ABSTRACT

Guide rail of an elevator, for guiding an elevator car and/or the counterweight of an elevator, which guide rail comprises an elongated metal profile piece that continues essentially the same in its cross-sectional shape, which metal profile piece comprises a continuous inside space for at least essentially the whole length of the guide rail.

26 Claims, 2 Drawing Sheets

(56) References Cited

FOREIGN PATENT DOCUMENTS

Figure 1:
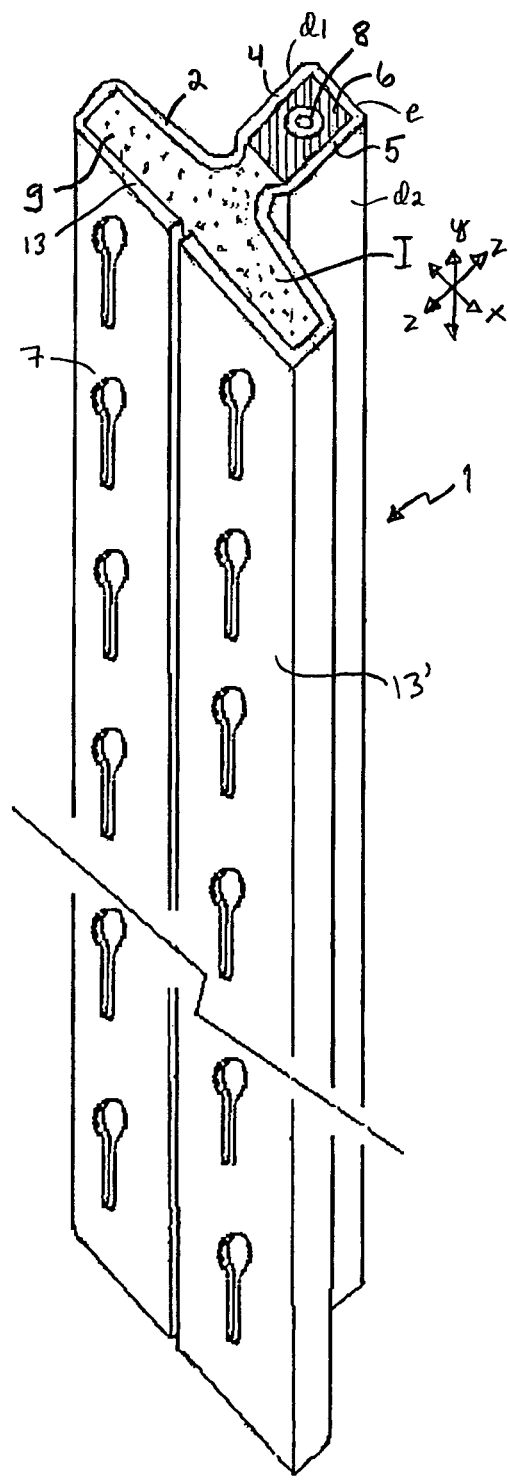

| | | | | |
|---|---|---|---|---|
| ES | 2350142 | A1 | 1/2011 | |
| FR | 929867 | A | 1/1948 | |
| FR | 929867 | A * | 1/1948 | ............. B66B 7/022 |
| GB | 2157654 | A | 10/1985 | |
| JP | 51109562 | A | 9/1976 | |
| JP | 04129983 | A * | 4/1992 | ................ B66B 7/02 |
| JP | 10087224 | A * | 4/1998 | ................ B66B 7/02 |
| JP | 2007186328 | A | 7/2007 | |

OTHER PUBLICATIONS

International Search Report, Jun. 17, 2011.
Written Opinion of the International Searching Authority, Jun. 17, 2011.
Extended European Search Report issued in European Patent Application No. 11758869, dated Feb. 29, 2016.

* cited by examiner

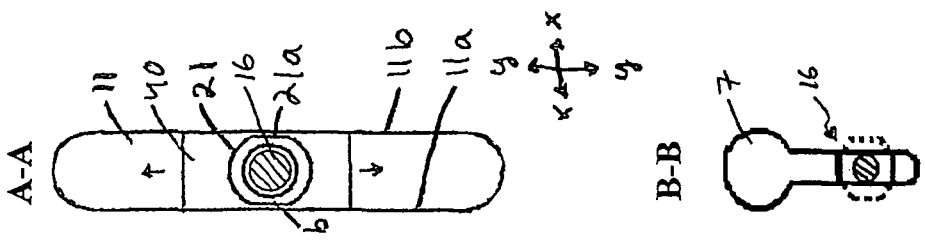
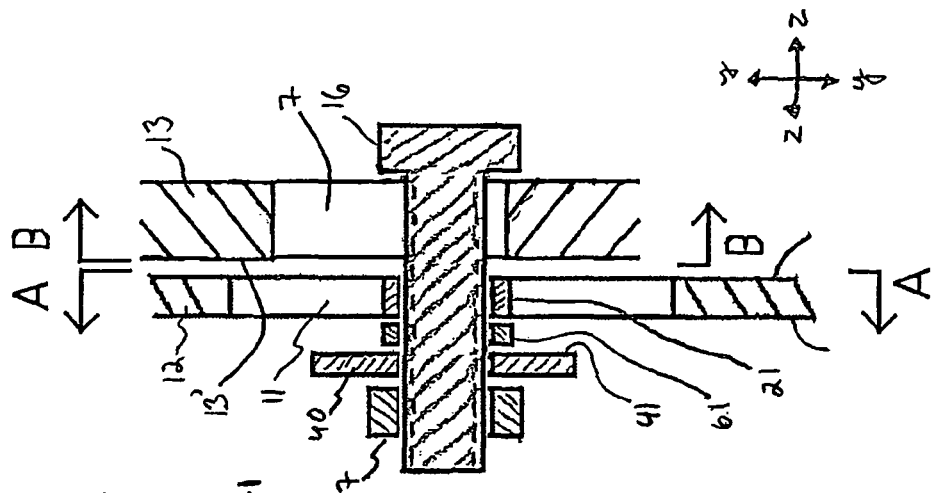
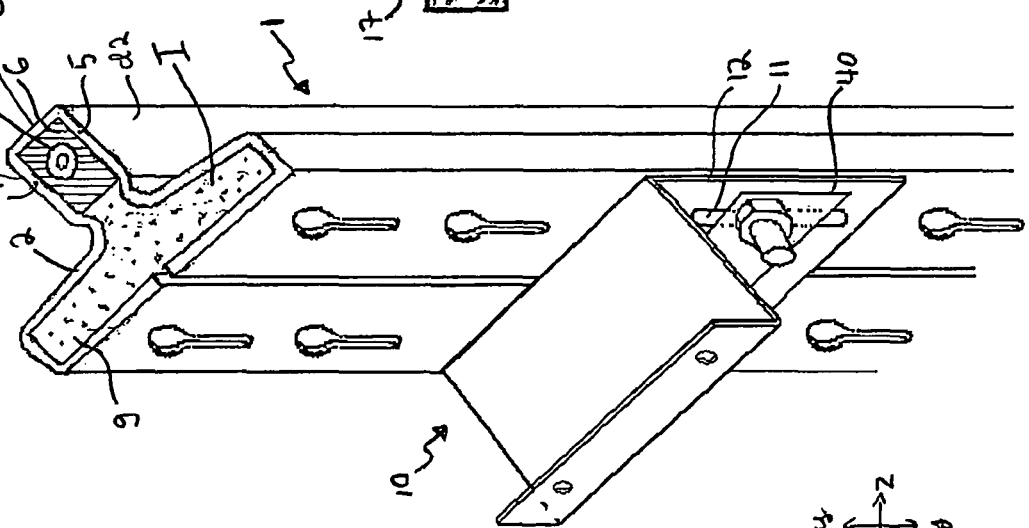
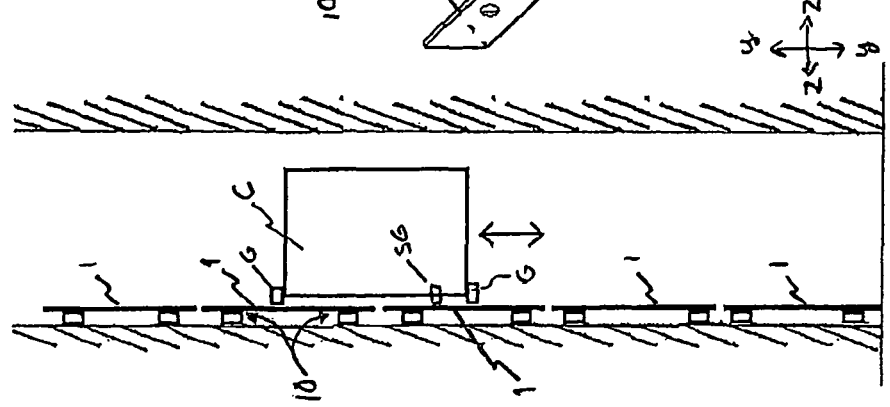

US 9,381,770 B2

GUIDE RAIL OF AN ELEVATOR, AND AN ELEVATOR

CROSS REFERENCE TO RELATED APPLICATIONS

This application is a continuation of International Application Number PCT/FI2011/000017 filed Mar. 22, 2011 and claims priority to Finish Application Number 201000129 filed Mar. 24, 2010, the entire contents of each of which are hereby incorporated herein by reference.

FIELD OF THE INVENTION

The object of the invention is a guide rail of an elevator, and an elevator.

BACKGROUND OF THE INVENTION

The guide rails of an elevator, such as the car guide rails or counterweight guide rails, are conventionally manufactured from a solid piece. A problem with these types of guide rails is the great weight and price. Likewise, the transportation and handling of them is awkward. Guide rails that are formed to be partially hollow are also known in the art. One problem with them, however, is the noise during operation, because this type of guide rail may start to resound during use. Another problem is also the disadvantageous behavior in a gripping situation, because the strong compression exerted on a guide rail in gripping can shape the guide rail, causing unevenness in the guide rail. That being the case, hollow guide rails according to prior art have had to be formed into heavy structures so that the guide rails withstand gripping. Yet another problem has been the fixing of a guide rail into its position. The guide rails of an elevator are generally fixed in position by stacking elongated guide rails to be supported by each other in the vertical direction and by supporting them on the building to be immovable in the lateral direction with guide rail brackets, which aim to permit longitudinal movement of a guide rail in relation to the building. A guide rail must be able to move in relation to the building because the dimensional changes of a long guide rail line and of the building in relation to time are different. After the construction phase the drying of concrete, in particular, results in shrinking of the building, a consequence of which can be compression of the guide rail line into a curve if the guide rails of the guide rail line are not able to move in relation to the building. This relative movement is in prior art arranged to occur e.g. with sliding between a guide rail bracket rigidly fixed to the building and the guide rail. In these types of solutions the guide rail clamp of the guide rail bracket presses the guide rail against the base comprised in the guide rail bracket. A problem of this solution is that the thickness tolerances of the guide rails are large and the compression force exerted by the guide rail clamp on the guide rail might form to be too great, preventing sliding between the guide rail and the clamp. A consequence of this can be bulging of the guide rail line as the guide rails are compressed into a curve, particularly when the guide rails are hollow. A problem of a guide rail clamp fixing has also been that the guide rail bracket and the guide rail clamp take space, because the clamp must extend to the side and to the front of the guide rail to press the guide rail against the mounting base formed by the frame of the guide rail bracket. Another problem in the fixing of guide rails has been that if it is desired to avoid guide rail clamps it has been necessary to make holes in the guide rails by drilling either at the factory or on site. Drilling is an ineffective manufacturing method and the positions of the holes must be accurately selected in advance. A hole fixing has also left the head of the bolt on the front side of the guide rail in view, taking space from in front of the guide rail.

AIM OF THE INVENTION

The aim of the invention is to produce a better guide rail and elevator than earlier. The object of the invention is to eliminate, among others, the aforementioned drawbacks of prior-art solutions. The aim of the invention is further to produce one or more of the following advantages, among others:
  a guide rail and elevator are achieved that have inexpensive manufacturing costs,
  a light guide rail and elevator are achieved,
  a light guide rail of good bending rigidity is achieved,
  a guide rail and elevator that produce/retain good ride comfort are achieved,
  a safe elevator is achieved,
  an elevator is achieved, the large manufacturing tolerances of the guide rails of which cause fewer problems than earlier.
  a light guide rail and elevator are achieved, the noise problems of which are fewer than earlier,

SUMMARY OF THE INVENTION

The guide rail of an elevator according to the invention for guiding an elevator car and/or a counterweight of an elevator comprises an elongated metal profile piece that continues essentially the same in its cross-sectional shape, which metal profile piece comprises a continuous inside space for essentially the whole length of the guide rail. Thus a light guide rail is achieved.

In a preferred embodiment of the invention the metal profile piece comprises profile walls at a distance from each other, between which is an inside space, and in the aforementioned inside space there are stiffening means, which are fitted to support the walls from the inside for essentially the whole length of the inside space for limiting the pressing of the walls towards each other. In this way a lighter structure of a guide rail is enabled, and/or the behavior in gripping or when a guide is supported on the guide rail in question is improved In a preferred embodiment of the invention the metal profile piece, more particularly the aforementioned profile walls of it, comprises outer surfaces that point towards opposite sides of the guide rail and form guide rail surfaces for guiding a moving elevator unit and/or gripping surfaces for the brake of a moving elevator unit. In this way preferably the aforementioned advantages are achieved simply.

In a preferred embodiment of the invention the stiffening means comprise a stiffener or a plurality of stiffeners, which is fitted to support the walls from the inside for essentially the whole length of the guide rail for limiting the pressing of the walls towards each other. In this way the properties that continue essentially the same are achieved in the longitudinal direction of the guide rail.

In a preferred embodiment of the invention the aforementioned stiffener or plurality (e.g. placed consecutively) of stiffeners forms a stiffener or a plurality of stiffeners, such as a stiffener line, that covers essentially the whole length of the inside space of the guide rail. In this way in the longitudinal direction of the inside space the stiffening does not contain any gaps, i.e. the stiffening is at least essentially continuous.

In a preferred embodiment of the invention, the aforementioned stiffener at least essentially extends from one aforementioned wall to the other. Thus the compression is not able to change the shapes of the guide rail.

In a preferred embodiment of the invention the stiffener comprises a section filling essentially the whole distance between the walls. Thus the compression does not change the shapes of the guide rail.

In a preferred embodiment of the invention the stiffener comprises an enclosed section extending in the lateral direction directly essentially from one wall to the other wall. Thus the compression is not able to change the shapes of the guide rail.

In a preferred embodiment of the invention the stiffener is an elongated stiffener rod and is placed into the elongated inside space in the longitudinal direction. Thus the stiffener is simple and effective.

In a preferred embodiment of the invention the stiffener comprises an essentially enclosed section extending in the lateral direction directly essentially from one wall to the other wall, which section continues in the longitudinal direction of the guide rail. Thus the stiffener is simple and effective.

In a preferred embodiment of the invention, the stiffener is a solid stiffener part, which is placed into the inside space in a solid state, preferably of metal. Thus stiffening is simple to arrange. The metal is preferably aluminium owing to its lightness or is of the same material as the metal profile piece owing to the chemical non-reactivity.

In a preferred embodiment of the invention the stiffener is a solid stiffener part, which is fed into the inside space in a flowing form and allowed to harden. Thus stiffening is simple to arrange. The shaping of the stiffener is also easy, and the structure can easily be made to be free of any clearance. In this case the material is preferably a polymer-based substance, the curing hardness of which must, however, be fitted to be sufficiently great for it to function as a stiffener. It can be of any hardening substance whatsoever, such as glue, in which case the rigidity can easily be fitted to be high. The stiffener is able to keep the walls essentially in their position during a gripping situation, for which purpose the stiffener is preferably 50 Mpa or more in its compression strength.

In a preferred embodiment of the invention the guide rail comprises alignment means formed in the stiffening means and pointing in both longitudinal directions of the guide rail, which alignment means comprise a recess and/or a protrusion, with which the stiffeners that come against each other of consecutive guide rails are arranged to be connected to each other with a male-female joint.

In a preferred embodiment of the invention the stiffener is at least 50 Mpa or more in its compression strength. The stronger in compression a stiffener is, the better it withstands compression, so that the compression strength could preferably be significantly greater, e.g. achieved with metal.

In a preferred embodiment of the invention the stiffener is of a flowing substance, preferably of sand or polymer particles. Thus the stiffener is inexpensive and simple. With polymer particles the stiffener is light.

In a preferred embodiment of the invention the guide rail comprises a profile wall that bounds the inside space and that comprises a rear surface of the guide rail for placing against the fixing surface of a mounting base, and which profile wall comprises fixing holes leading into the inside space for fixing the guide rail against the mounting base by means of the fixing holes. Thus the guide rail arrangement is easy to form to be narrow. Likewise, making the fixings on site becomes easier.

In a preferred embodiment of the invention the guide rail comprises fixing holes at regular intervals leading into the inside space. Thus performing the fixings becomes easier, because drillings no longer need to be performed at the installation site.

In a preferred embodiment of the invention the aforementioned metal profile piece is an elongated piece, which comprises a continuous fixing flange for essentially the whole length of the guide rail, which fixing flange comprises an (even) rear surface facing the rear side of the guide rail, from which fixing flange a guide rail flange branches to the opposite side (front side) of the guide rail, which guide rail flange comprises at least guide rail surfaces (d1,d2) facing both sides of the guide rail, and preferably also a guide rail surface facing the front side of the guide rail.

In a preferred embodiment of the invention the fixing flange comprises an inside space, which comprises a sound insulator. In this way a light guide rail can be formed to be quiet.

In a preferred embodiment of the invention the sound insulator is of sound insulation material, which preferably fills at least most of the otherwise free inside space of the fixing flange, preferably it fills essentially the whole of the otherwise free inside space (volume) of the fixing flange. In this way the elimination of echoing spaces and effective damping are achieved. The sound is not conducted into the building.

In a preferred embodiment of the invention the stiffener or plurality of stiffeners fills at least most of the otherwise free inside space of the guide rail flange, preferably essentially the whole of the otherwise free inside space (volume) of the guide rail flange. Thus the stiffening is effective.

In a preferred embodiment of the invention the sound insulation material is foamed polymer, preferably polyurethane. Thus the sound insulation material is simple to install. With the material it is thus also easy to fill the inside space sufficiently.

In a preferred embodiment of the invention the sound insulator is of a flowing substance, preferably of sand or polymer particles. The material is thus easy to place into its position. Thus the sound insulator is inexpensive and simple. With polymer particles it is light. Sand, for its part, is cheap and ecological. The polymer particles are preferably of polystyrene foam in granular form. Thus the structure is inexpensive and easy to form.

In a preferred embodiment of the invention, the sound insulator is a solid sound insulator part, which is placed into the inside space in a solid state. Thus the sound insulation is simple to perform at the installation site.

In a preferred embodiment of the invention the sound insulator is a solid part, which is fed into the inside space in a flowing form and allowed to harden. In this way the material fills the inside space well and, however, the later escaping of material from the inside space is prevented.

In a preferred embodiment of the invention the metal profile piece is a metal profile piece bent from plate in the longitudinal direction of the guide rail, preferably by cold roll forming. Thus the manufacturing process is simple and effective.

The elevator according to the invention comprises at least an elevator car, and a plurality of guide rails placed consecutively end-to-end, for guiding a moving elevator unit, such as an elevator car or a possible counterweight, which guide rails are according to one of those defined in the preceding. In this way the advantages described above are achieved. The elevator is, inter alia, easily installed and inexpensive.

In a preferred embodiment of the invention the brake on the elevator car or on the counterweight is arranged to grip the guide rail for decelerating the aforementioned elevator car and/or counterweight. Thus the elevator is safe.

In a preferred embodiment of the invention consecutive guide rails are fixed to each other with a plate fixed against the rear surface of both guide rails, which plate comprises lateral support bends that closely fit along the guide rail and that extend against both sides of both guide rails. Thus the fixing is rigid and reliable.

In a preferred embodiment of the invention the guide rail is fixed into its position vertically in the building or corresponding with a guide rail bracket by fixing the rear surface of the guide rail against the surface of the mounting base comprised in the guide rail bracket, and that the guide rail bracket is behind the guide rail such that the guide rail bracket extends in the immediate proximity of the guide rail (≤2 cm from the rear surface) at most to the level of the sides of the guide rail. The width of a guide rail bracket is in this case in the immediate proximity of the guide rail at most the same as the width of the guide rail. Thus the guide rail fixing is compact.

In a preferred embodiment of the invention the guide rail is fixed into its position vertically in the building or corresponding with a guide rail bracket by fixing the rear surface of the guide rail against the guide rail bracket with compressing fixing means, which extend into the fixing holes comprised in the profile wall comprising a rear surface of the guide rail a, preferably such that the fixing means take the support force of the compression from the surface of the inside space or of the fixing hole. In this way space is saved from the front/sides of the guide rail.

In a preferred embodiment of the invention the metal profile piece 2 is a profile piece that is open in the direction of the ends of the guide rail. The profile piece comprises an inside space, which continues from end to end of the guide rail. Thus the structure can be manufactured simply.

In a preferred embodiment of the invention the guide rail comprises a profile wall that bounds the inside space and that comprises a rear surface of the guide rail, which is placed against the fixing surface of a mounting base, and which profile wall comprises fixing holes leading into the inside space for fixing the guide rail against the mounting base by means of the fixing holes. Thus the fixing is simple and can be made compactly.

In a preferred embodiment of the invention a fixing hole comprises a wide section, through which the head of the bolt or corresponding comprised in the fixing means is pushed, and a narrow section, at the point of which the shank of the bolt pushed through the hole is shifted in the longitudinal direction of the guide rail away from the point of the wide section, and the bolt is tightened such that the shank is at the point of the narrow section and the edge structure of the fixing hole prevents lateral movement of the shank of the bolt, and the tightening of the bolt presses the head of the bolt towards the surface of the inside space preventing shifting of the bolt in relation to the guide rail in the longitudinal direction of the guide rail. Thus the fixing is simple, fast and reliable.

In a preferred embodiment of the invention a narrow section of a fixing hole is below the extensive section of the fixing hole. In this way when the building subsides over the course of time the fixing means do not move in a direction that causes a risk of loosening.

In a preferred embodiment of the invention the fixing holes are manufactured by cutting, e.g. in connection with the cold roll forming process of the guide rail profile. In this way drilling is avoided.

In a preferred embodiment of the invention the guide rail is supported on the frame of a guide rail bracket supported on the building movably in relation to the frame in the longitudinal direction of the guide rail with an arrangement in which the frame of the guide rail bracket comprises guide surfaces that face opposite sides of the frame, and on the opposite sides of the frame are guide surfaces that are pressed towards each other and are in connection with the guide rail, which guide surfaces are fitted to be guided by the aforementioned guide surfaces of the frame and to transmit support force in the direction of the compression from the frame to the guide rail, and which arrangement comprises means for keeping the aforementioned guide surfaces of the guide rail at a distance from each other in the direction of the compression. The transmission of compression to the frame can be limited, so that the friction between the guide surfaces remains small. This is based on a concept that the frame can be arranged to comprise guide surfaces, which are arranged to guide the guide surfaces that are in connection with the guide rail, which guide surfaces take the support force needed for the guidance from the guide surfaces of the frame that are between them. Further, according to the concept, the guide surfaces that are in connection with the guide rail are kept at a distance from each other. Thus movability with relation to each other of the guide surfaces of the guide rail and the guide surfaces of the frame in the longitudinal direction is ensured. From this it follows that the movability of the guide rail in relation to the building is more reliable than earlier. This can form a separate invention that is not more particularly dependent on the structure of the guide rail/any other features specified in the preceding.

In a preferred embodiment of the invention the means bear the aforementioned compression and limit the transmission of the compression, at least in its entirety, to the guide surfaces of the frame that are between the guide surfaces that are in connection with the guide rail. The transmission of compression to the frame can be limited, so that the friction between the guide surfaces remains small.

In a preferred embodiment of the invention the means comprise a member/members between the elements comprising the guide surfaces connected to the guide rail, which member/members mechanically prevent/prevents the elements comprising the guide surfaces connected to the guide rail from being compressed to below a certain distance from each other. The transmission of compression to the frame can thus be advantageously limited.

In a preferred embodiment of the invention the aforementioned means comprise a member (guide piece 21) between the elements comprising the guide surfaces connected to the guide rail, the thickness of which member (guide piece 21) corresponds to the thickness of the frame in the direction of the compression. The member thus bears the compression.

In a preferred embodiment of the invention the aforementioned means comprise a member (guide piece 21) stacked in the direction of the compression between the elements comprising guide surfaces that are in connection with the guide rail, the thickness of which member (guide piece 21) corresponds to the thickness of the frame in the direction of the compression, and also at least one clearance adjusting member, which together keep the guide surfaces at a distance from each other, which distance is the thickness of the aforementioned member (guide piece 21)+the thickness of at least one aforementioned clearance adjusting member. With the adjusting member the clearance between the stationary frame 2 and the guide surfaces that are on opposite sides of the frame, move in relation to the frame and are in connection with the guide rail can be controlled.

In a preferred embodiment of the invention the aforementioned direction of the compression is the first horizontal direction and the arrangement also comprises guide means, which transmit support force from the frame to the guide rail in the second horizontal direction, which is at a right angle in relation to the first horizontal direction. Thus the guide rail can be guided effectively in both horizontal directions with the same guide rail bracket.

In a preferred embodiment of the invention the aforementioned member (guide piece 21) between the elements comprising the guide surfaces connected to the guide rail is a guide piece, which at the same time functions as a guide piece traveling on the guide rail comprised in the frame, and transmits support force from the frame to the guide rail in the second horizontal direction x. In this way a simple and compact solution is achieved.

In a preferred embodiment of the invention the guide means for transmitting support force from the frame to the guide rail in the second horizontal direction comprise an elongated guide and a guide piece traveling guided by the guide, which guide piece is preferably connected to the guide rail such that it can transmit support force from the guide in the direction x to the guide rail. The guide piece thus moves along with the guide rail. The solution can be implemented simply and compactly.

In a preferred embodiment of the invention at least the second of the elements comprising a guide surface that is in connection with the guide rail is connected to the actual guide rail by fixing it with fixing means to the guide rail. The wall comprised in the rear surface of the guide rail preferably forms a second element comprising a guide surface that is in connection with the guide rail. The guide surface 13' is in this case the rear surface of the guide rail. The guide rail itself is thus simple in its structure when the frame can be fitted between the guide rail and the element that is on the rear side of the frame and fixed to the guide rail.

In a preferred embodiment of the invention the frame comprises a frame part, preferably a plate, which frame part comprises a guide slot for guiding the guide piece that travels in the guide slot and that is connected to the guide rail, which guide piece transmits support force from the guide groove to the guide rail in the second horizontal direction, and the aforementioned guide surfaces facing opposite sides of the frame, which guide surfaces transmit support force to the guide rail in the first horizontal direction.

In a preferred embodiment of the invention the guide surfaces that are in connection with the guide rail are pressed towards each other by the aid of a member traveling via the hole extending through the guide rail, preferably with a bolt and with a nut on the threaded end of the bolt. The solution is thus simple.

In a preferred embodiment of the invention the clearance adjusting member is a shim plate, preferably a washer. The solution is thus simple.

In a preferred embodiment of the invention the clearance adjusting member is a shim plate, and its material thickness (in the direction of the compression) is preferably 0.1-0.5 mm, most preferably 0.2-0.4 mm. When the thickness of the guide piece corresponds to the thickness of the frame, the thickness of the adjusting member sets the clearance between the stationary frame and the elements 13 and 40 that move in relation to it. Thus the clearance is easy to adjust to that desired.

In a preferred embodiment of the invention the member (guide piece 21) is a bushing, preferably a plate-type bushing, such as a washer, and preferably of metal. The solution is thus simple.

In a preferred embodiment of the invention the stiffeners that are against each other of consecutive guide rails are connected to each other using a male-female joint, which joint prevents lateral movement in relation to each other of the stiffeners that are against each other of consecutive guide rails. Thus the joint is fast and simple.

Some inventive embodiments are also presented in the descriptive section and in the drawings of the present application. The inventive content in the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments of the invention can be applied within the framework of the basic inventive concept in conjunction with other embodiments. Each embodiment can also singly and separately from the other embodiments form a separate invention.

LIST OF FIGURES

In the following, the invention will be described in detail by the aid of some examples of its embodiments with reference to the attached drawings, wherein FIG. 1 presents a guide rail of an elevator according to the invention to be utilized in an elevator according to the invention.

FIG. 2 presents an elevator according to the invention.

Figure 3:
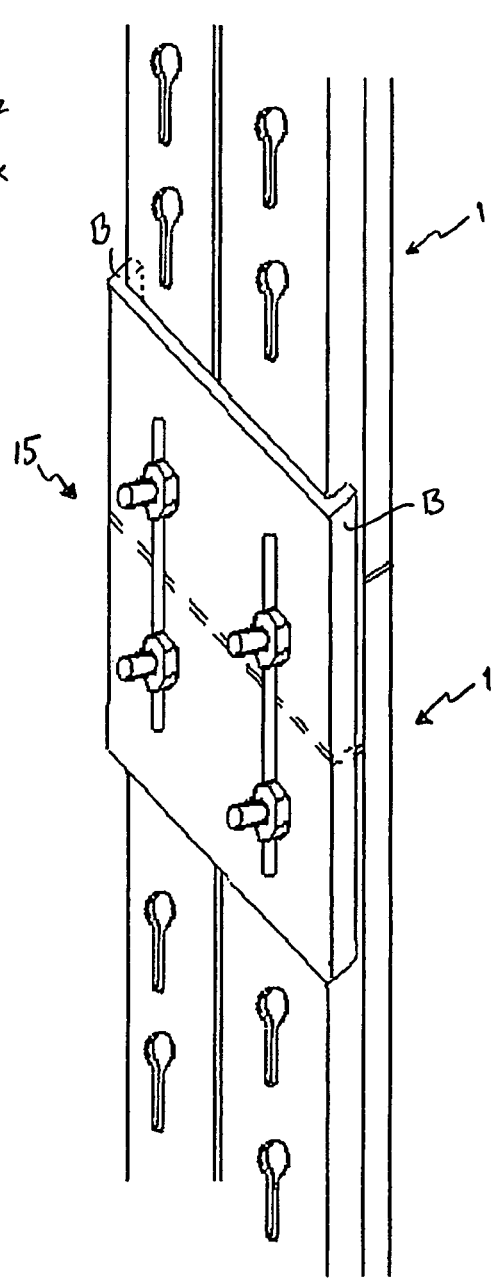

FIG. 3 presents the fixing to each other of consecutive guide rails of an elevator according to the invention.

FIGS. 4-6 present the fixing of a guide rail of an elevator according to the invention to a building or corresponding.

DETAILED DESCRIPTION OF THE INVENTION

FIG. 1 presents a guide rail of an elevator according to the invention to be utilized in an elevator according to the invention. The guide rail 1 is suited for guiding an elevator car 9 and/or the counterweight of an elevator, and comprises an elongated metal profile piece 2 that continues essentially the same in its cross-sectional shape, which metal profile piece comprises a continuous inside space I for essentially the whole length of the guide rail. The metal profile piece is e.g. of steel and comprises profile walls 4 and 5 at a distance from each other, between which is a part of an inside space I. In this inside space there are stiffening means 6, which are fitted to support the walls (4,5) from the inside for essentially the whole length of the guide rail 1 for limiting the pressing of the walls towards each other. Thus the profile walls withstand well the compression, which tries to press the walls 4 and 5 towards each other. The compression can be caused by the action of guides and/or by the action of a brake. The profile walls 4,5 comprise outer surfaces that point towards opposite sides of the guide rail. They form surfaces against which the brake of a moving elevator unit C, such as of a car or counterweight, presses a brake pad or corresponding in braking. Preferably the aforementioned outer surfaces form guide rail surfaces, following and guided by which the elevator unit travels, e.g. by means of a roller guide or a sliding guide. The guide rail surfaces each comprise for this purpose an even guide rail surface in the longitudinal direction of the guide rail. The aforementioned stiffening means 6 comprise a stiffener 6 or a plurality of stiffeners, which is fitted to support the walls from the inside for essentially the whole length of the guide rail for limiting the pressing of the walls towards each other. The stiffening means can thus be formed from a number of stiffeners or only from one long stiffener. The aforementioned stiffener or plurality of stiffeners placed consecutively in this way forms a stiffener or a stiffener line that covers essentially the whole length of the inside space of the guide rail. In this case the stiffener alone or the stiffener line covers at least 85%, preferably at least 90%, even more preferably at least 95% of the length of the inside space, forming continuous stiffening in the longitudinal direction of the guide rail. The stiffener is in this case most preferably an elongated stiffener rod 6 and is placed into the elongated inside space in the longitudinal direction. It continues preferably according to the cross-section presented in FIG. 1 essentially for the whole of its own length (excluding possible alignment means at the ends). The stiffener 6 extends from the wall 4 to the other wall 5 and comprises a section filling essentially the whole distance between the walls, which section preferably fills the whole distance between the walls for essentially the whole length of the stiffener. It comprises an essentially enclosed section extending in the lateral direction directly from the wall 4 to the other wall 5. Extending from one wall to the other means that the stiffener reaches from the immediate proximity of one wall to the immediate proximity of the other wall, but between them, however, can be a small clearance, e.g. owing to installation tolerances. The clearance is preferably less than 1 mm, more preferably less than 0.5 mm.

The stiffener is most preferably, as presented, a solid stiffener part, which is placed into the inside space in a solid state, preferably of metal, most preferably of aluminium (light) or of the same metal material as the metal profile piece (a chemically non-reacting pair). It could, however, if so desired, be formed such that the stiffener is a solid stiffener part, which is fed into the inside space in a flowing form and allowed to harden. The stiffener can in this case be of a hard polymer. Alternatively, the stiffener 6 can be of sand or some other flowing material.

Alignment means 8 pointing in both longitudinal directions of the guide rail are formed in the stiffening means, which alignment means comprise a recess and/or a protrusion, with which the stiffeners that come against each other of consecutive guide rails 1 are arranged to be connected to each other with a male-female joint.

The guide rail comprises a profile wall 13 that bounds the inside space I and that comprises a rear surface 13' of the guide rail 1 for placing against the fixing surface 31 of the mounting base 12, and which profile wall 13 comprises fixing holes 7 leading into the inside space I for fixing the guide rail 1 against the mounting base 12 by means of the fixing holes.

The metal profile piece 2 is preferably a metal profile piece bent from plate in the longitudinal direction of the guide rail, preferably by cold roll forming. The metal profile piece 2 is preferably, as presented, an elongated piece, which comprises a continuous fixing flange for essentially the whole length of the guide rail, which fixing flange comprises an (even) rear surface facing the rear side of the guide rail, from which fixing flange a guide rail flange branches to the opposite side (front side) of the guide rail, which guide rail flange comprises at least guide rail surfaces facing both sides of the guide rail, and preferably also a guide rail surface (e) facing towards the front side of the guide rail. The aforementioned guide rail flange comprises the aforementioned walls 4 and 5. The fixing flange comprises an inside space, which comprises a sound insulator 9. The inside space of the fixing flange is in connection with the inside space of the guide rail flange, so that they are a part of a larger inside space I, but the fixing flange and/or the guide rail flange could alternatively comprise their own inside spaces. The sound insulator 9 is of a sound insulation material essentially filling the inside space of the fixing flange. The sound insulation material is foamed polymer, preferably polyurethane. Preferably the sound insulator is a solid part, which is fed into the inside space in a flowing form and allowed to harden (e.g. PUR). Alternatively, the sound insulator material is a flowing substance, preferably sand or polymer particles. Alternatively, the sound insulator 9 is a solid part, which is placed into the inside space in a solid state.

FIG. 2 presents an indicative side view of an elevator according to the invention, which elevator comprises at least a moving elevator unit C, such as an elevator car C, and a plurality of guide rails 1 placed consecutively end-to-end, for guiding a moving elevator unit, such as an elevator car or a possible counterweight. The guide rails are preferably according to FIG. 1. The guide rails are also preferably according to what is described above. All the aforementioned features are not, however, necessary. The brake SG on the moving elevator unit C is arranged to grip the guide rail 1 for decelerating the aforementioned elevator unit (elevator car or counterweight). The elevator unit C presented is preferably an elevator car applicable to transporting passengers. The elevator unit C is guided on the guide rail surfaces d1, d2 comprised in the guide rails 1, following which guide rail surfaces the elevator unit moves, e.g. by means of a roller guide or a sliding guide G.

The guide rails 1 are fixed to the building with a guide rail bracket 10, which essentially prevents at its point lateral movement of the guide rail 1 in relation to the fixing point of the guide rail bracket 10 and permits longitudinal movement of the guide rail in relation to the fixing point of the guide rail bracket 10. The fixing arrangement and guide rail bracket 10 of the elevator are presented in more detail in FIGS. 4-6, in which as presented the guide rail 1 is supported on the frame 12 of a guide rail bracket 10 supported on the building movably in relation to the frame in the longitudinal direction of the guide rail 1. The frame 12 of the guide rail bracket 10 comprises guide surfaces (31,51) that face opposite sides of the frame 2, and in the arrangement on the opposite sides of the frame 2 are guide surfaces 13' and 41 that are pressed towards each other and are in connection with the guide rail, which guide surfaces face towards the guide surfaces of the frame, and which guide surfaces are fitted to move guided by the aforementioned guide surfaces (31,51) of the frame and to transmit support force (z) in the direction of the compression from the frame to the guide rail (in both z-directions). The guide surface 13' is preferably but not necessarily in the manner presented an integral surface of the guide rail 1, but it could alternatively be a separate surface part fixed to the guide rail 1. The arrangement further comprises members (21, 61) for keeping the aforementioned guide surfaces 13' and 41 of the guide rail at a distance from each other in the direction of the compression. These members (21, 61) are connected to move along with the guide surfaces 13' and 41 in relation to the frame 12 and they bear the aforementioned compression and limit the transmission of the compression, at least in its entirety, to the guide surfaces of the frame 2 that are between the guide surfaces 13' and 41 that are in connection with guide rail. The members (21, 61) comprise a guide piece 21 between the elements (13;40) comprising the guide surfaces connected to the guide rail, the thickness of which guide piece corresponds to the thickness of the frame in the direction of the compression and which guide piece mechanically prevents together with the clearance adjusting member the elements 13 and 40 (and their guide surfaces) from being compressed to below a certain distance from each other. In the arrangement the guide piece 21 is connected to the guide rail 1 and functions at the same time, in addition to limiting the distance of the guide surfaces, also as a guide piece traveling in the elongated guide 11 comprised in the frame 12, and transmits support force from the guide 11 of the frame to the guide rail 1 in the second horizontal direction x. The frame 12 comprises a frame part, which is of plate material, and which frame part comprises the aforementioned guide slot 11 and the aforementioned guide surfaces (31,51) that face opposite directions of the frame, which guide surfaces can transmit support force to the guide rail in the horizontal direction (z). The side walls of the guide slot 11 form longitudinal guide surfaces 11a, 11b of the guide slot for guiding the guide piece 21 traveling in the guide slot, which guide piece 21 comprises guide surfaces 21a and 21b corresponding to the guide surfaces 11a, 11b.

Movability with respect to each other between the guide surfaces can be assisted such that at least a part of the guide surfaces 13',31,51,41 are treated with a surface treatment that reduces friction, preferably by coating the surface with a material that reduces friction and/or by polishing the surface. The coating is most preferably of a material containing Teflon, preferably sprayed onto the surface of the part to be coated. Most preferably at least the guide surface 31 of the frame as well as the guide surface 51 or 41 are treated in this way.

FIG. 5 presents a side view of a section from the point of the guide rail bracket of FIG. 4. FIG. 6 presents details of FIGS. 4 and 5. The other parts presented in the figure are pressed together with the means 6 and 7. In compression the means (21, 61) keep the guide surfaces (13') and (41) of the guide rail at a distance from each other in the direction of the compression. This is achieved with the means (21, 61), which comprise the guide piece 21 and the clearance adjusting member 61 that are between the elements (3,5;40) comprising the guide surfaces of the guide rail, which means mechanically prevent the means (13;40) comprising the guide surfaces of the guide rail from being compressed to below a certain distance from each other. They bear the aforementioned compression and limit the transmission of the compression, at least in its entirety, to the guide surfaces (13' and 41) of the frame. Between the elements (13;40) comprising guide surfaces is, as presented, a guide piece 21 stacked in the direction of the compression, the thickness of which guide piece corresponds to the thickness of the frame in the direction of the compression, and also a clearance adjusting member 61, which guide piece and clearance adjusting member together keep the guide surfaces 13' and 41 at a distance from each other, which distance is the thickness of the aforementioned member (guide piece 21)+the thickness of the clearance adjusting member (61). The clearance adjusting member 61 is a shim plate, which in its material thickness in the direction of the compression is preferably 0.1-0.5 mm, most preferably 0.2-0.4 mm. When the thickness of the guide piece corresponds, as presented, to the thickness of the frame, the thickness of the adjusting member sets the clearance between the stationary frame 12 and the guide surfaces 13' and 41 that are on opposite sides of the frame and that move in relation to the frame. The guide piece 21 and the clearance adjusting member are stacked/pressed face-to-face such that the clearance adjusting member does not reach to extend against the guide surface. That being the case, it is advantageous to form the clearance adjusting member 61 at least in the x direction to be the width of the guide groove or narrower than the guide groove 11.

The guide rail 1 is fixed into its position vertically in the building or corresponding with a guide rail bracket 10 by fixing the rear surface 13' of the guide rail 1 against the mounting base surface 31 comprised in the guide rail bracket 10. This is preferably done such that the guide rail bracket is behind the guide rail such that the guide rail bracket extends in the immediate proximity of the guide rail (≤2 cm from the rear surface) at most to the level of the sides of the guide rail. The width of the guide rail bracket is in this case in the immediate proximity of the guide rail at most the same as the width of the guide rail. The guide rail is fixed into its position vertically in the building or corresponding with a guide rail bracket by fixing the rear surface of the guide rail against the guide rail bracket with compressing fixing means, which extend into the fixing holes 7 comprised in the profile wall comprising the rear surface of the guide rail, preferably such that the fixing means take the support force of the compression from the surface of the inside space I. The guide rail comprises a profile wall 13 that bounds the inside space I and that comprises a rear surface 13' of the guide rail 1, which rear surface is placed against the fixing surface 31 of the mounting base 12, and which profile wall 13 comprises fixing holes 7 leading into the inside space I for fixing the guide rail 1 against the mounting base 12 by means of the fixing holes. A fixing hole 7 comprises a wide section, through which the head of the bolt or corresponding comprised in the fixing means is pushed, and a narrow section, at the point of which the shank of the bolt pushed through the hole 8 is shifted in the longitudinal direction of the guide rail away from the point of the wide section 16, and the bolt (16) is tightened such that the shank is at the point of the narrow section and the edge structure of the fixing hole 7 prevents lateral (x) movement of the shank of the bolt 16, and the tightening of the bolt 16 presses the head of the bolt 16 towards the surface of the inside space I preventing shifting of the bolt 16 in relation to the guide rail 1 in the longitudinal direction y of the guide rail. A narrow section of a fixing hole 7 is below the extensive section of the fixing hole 7. In this way settling of the building does not return the head of the bolt to the point of the wide section. The fixing holes 7 are manufactured by cutting, e.g. in connection with the cold roll forming process of the guide rail profile 2. Since the guide surfaces 13 and 41 are in connection with the guide rail 1, as a consequence they move along with the guide rail 1.

FIG. 3 presents a fixing of guide rails to each other. Consecutive guide rails are fixed to each other with a plate 15 fixed against the rear surface 13' of both guide rails, which plate comprises lateral support bends B that travel closely fitting along the guide rail and that extend against both sides of both guide rails.

The holes 7 could alternatively be manufactured as round holes and a threaded part, e.g. a press nut, could be added to the hole as an insert. In this case a bolt 16 or corresponding fastener is placed in a directionally opposite manner than what is presented in the figures.

The term "essentially the whole length/distance/volume" means at least an 85% proportion, preferably at least a 90% proportion, still more preferably at least a 95% proportion, most preferably of all at least a 97% proportion.

It is obvious to the person skilled in the art that the invention is not limited to the embodiments described above, in which the invention is described using examples, but that many adaptations and different embodiments of the invention are possible within the frameworks of the inventive concept defined by the claims presented below.

The invention claimed is:

1. A guide rail of an elevator, the guide rail being configured to guide a movable elevator unit, wherein the guide rail comprises:
   an elongated metal profile piece with a substantially uniform cross-sectional shape throughout a length of the guide rail, the elongated metal profile piece having a continuous inside space throughout the length of the guide rail, the elongated metal profile piece including,
profile walls spaced apart at a distance from each other by the continuous inside space, wherein
first portions of the profile walls are configured to at least one of (i) guide the movable elevator unit and (ii) brake the movable elevator unit, and
second portions of the profile walls are configured to fix the guide rail to a mounting base of the elevator; and
a stiffening part arranged entirely within a portion of the continuous inside space between the first portions of the profile walls, the stiffening part being configured to (i) support the first portions of the profile walls from the continuous inside space for the length of the guide rail, and (ii) limit movement of the profile walls towards each other, the stiffening part including
at least one stiffener configured to support the first portions of the profile walls from within the inside for the length of the guide rail, the at least one stiffener being configured to limit movement of the profile walls towards each other, the at least one stiffener extending an entire length of the continuous inside space of the guide rail.

2. The guide rail according to claim 1, wherein the first portions of the profile walls comprises:
outer surfaces that point towards opposite sides of the guide rail, the outer surfaces forming guide rail surfaces for guiding the movable elevator unit.

3. The guide according to claim 1, wherein the at least one stiffener extends from a first profile wall among the first portions of the profile walls to a second profile wall among the first portions of the profile walls.

4. The guide rail according to claim 1, wherein the at least one stiffener is an elongated stiffener rod arranged in the continuous inside space in a longitudinal direction of the guide rail.

5. The guide rail according to claim 1, wherein the at least one stiffener substantially fills free inside space of a guide rail flange of the guide rail, the free inside space being within the continuous inside space of the guide rail.

6. The guide rail according to claim 1, wherein
the at least one stiffener is a solid stiffener part arranged in the continuous inside space; and
the solid stiffener part is composed of aluminium or a metal as that of the elongated metal profile piece.

7. The guide rail according to claim 1, wherein the at least one stiffener is a solid stiffener part fed into the continuous inside space in a flowing form and allowed to harden.

8. The guide rail according to claim 1, wherein a rear surfaces of the second portions of the profile walls bound the continuous inside space, and form a rear surface of the guide rail, the rear surface of the guide rail being configured to be fixed to a fixing surface of a mounting base by fixing holes through the second portions of the profile walls, the fixing holes leading into the continuous inside space.

9. The guide rail according to claim 1, wherein the elongated metal profile piece is bent from a plate extending in a longitudinal direction of the guide rail.

10. A guide rail of an elevator, the guide rail being configured to guide a movable elevator unit, wherein the guide rail comprises:
an elongated metal profile piece with a substantially uniform cross-sectional shape throughout a length of the guide rail, the elongated metal profile piece having a continuous inside space throughout the length of the guide rail, the elongated metal profile piece including,
profile walls spaced apart at a distance from each other by the continuous inside space, and
a continuous fixing flange extending the length of the guide rail, the continuous fixing flange having a rear surface facing a rear side of the guide rail, wherein
first portions of the profile walls are configured to at least one of (i) guide the movable elevator unit and (ii) brake the movable elevator unit,
second portions of the profile walls are configured to fix the guide rail to a mounting base of the elevator, and
a guide rail flange branches from the continuous fixing flange to an opposite side of the guide rail to form the first portions of the profile walls and a front guide rail surface, the front guide rail surface facing a front side of the guide rail; and
a stiffening part arranged entirely within a portion of the continuous inside space between the first portions of the profile walls, the stiffening part being configured to (i) support the first portions of the profile walls from the continuous inside space for the length of the guide rail, and (ii) limit movement of the profile walls towards each other.

11. The guide rail according to claim 10, wherein the continuous fixing flange includes a sound insulator within the continuous inside space.

12. The guide rail according to claim 11, wherein the sound insulator is composed of sound insulation material, which fills a free portion of the continuous inside space within the continuous fixing flange that is not occupied by the stiffening part.

13. The guide rail according to claim 12, wherein the sound insulation material is foamed polymer.

14. The guide rail of claim 13, wherein the foamed polymer is polyurethane or polystyrene.

15. The guide rail according to claim 10, wherein the stiffening part comprises:
at least one stiffener configured to support the first portions of the profile walls from within the continuous inside space for the length of the guide rail, the at least one stiffener being configured to limit movement of the profile walls towards each other.

16. The guide rail of claim 15, wherein the at least one stiffener extends an entire length of the continuous inside space of the guide rail.

17. An elevator comprising:
at least an elevator car; and
a plurality of guide rails placed consecutively end-to-end, at least one of the plurality of guide rails being a guide rail of claim 1, and the plurality of guide rails being configured to guide movement of the movable elevator unit.

18. The elevator according to claim 17, wherein
rear surfaces of the second portions of the profile walls bound the continuous inside space, and form a rear surface of the guide rail, the rear surface of the guide rail being configured to be fixed to a fixing surface of a mounting base by fixing holes through the second portions of the profile walls, the fixing holes leading into the continuous inside space; and
the guide rail is fixed in position vertically in a building by fixing the rear surface of the guide rail against a guide rail bracket with a compression fixing part through the fixing holes.

19. The elevator according to claim 18, wherein
the guide rail is supported on a frame of the guide rail bracket;

the guide rail bracket is supported on the building;

the guide rail bracket is configured to move relative to the frame in a longitudinal direction of the guide rail;

the frame of the guide rail bracket includes guide surfaces that face opposite sides of the frame, the opposite sides of the frame being pressed towards each other and connected to the guide rail;

guide surfaces of the guide rail are configured to be guided by the guide surfaces of the frame, and to transmit support force in a direction of compression from the frame to the guide rail; and the elevator further includes first members for maintaining the guide surfaces of the frame, which are connected to the guide rail, at a distance from each other in the direction of the compression.

20. The elevator according to claim 19, wherein the compression fixing part bears the compression and limits the transmission of the compression to the guide surfaces of the frame connected to the guide rail.

21. The elevator according to claim 20, wherein the first members comprise:

a compression limiting part between the guide surfaces of the frame connected to the guide rail, the compression limiting part being configured to mechanically prevent the guide surfaces of the frame connected to the guide rail from being compressed to below a certain distance from each other.

22. The elevator according to claim 21, wherein the compression limiting part comprises:

a second member stacked in the direction of the compression between the guide surfaces of the frame connected to the guide rail, a thickness of the second member corresponding to a thickness of the frame in the direction of the compression; and at least one clearance adjusting member, a first guide piece and the clearance adjusting member being configured to maintain the guide surfaces at a distance from each other, the distance being the thickness of the second member and the thickness of the at least one clearance adjusting member.

23. The elevator according to claim 22, wherein the direction of the compression is a first horizontal direction and the arrangement also includes a guide configured to transmit support force from the frame to the guide rail in a second horizontal direction, the second horizontal direction being substantially perpendicular to the first horizontal direction.

24. The elevator according to claim 23, wherein the guide comprises:

an elongated guide and a second guide piece configured to be guided by the elongated guide, the second guide piece being connected to the guide rail such that the second guide piece is configured to transmit support force from the guide to the guide rail in the second horizontal direction.

25. The elevator according to claim 21, wherein the compression limiting part comprises:

a second member between the guide surfaces of the frame connected to the guide rail, a thickness of the second member corresponding to a thickness of the frame in the direction of the compression.

26. The elevator according to claim 17, wherein a brake on the movable elevator unit is arranged to grip the first portions of the profile walls for decelerating the movable elevator unit.

* * * * *